Patented Aug. 18, 1931

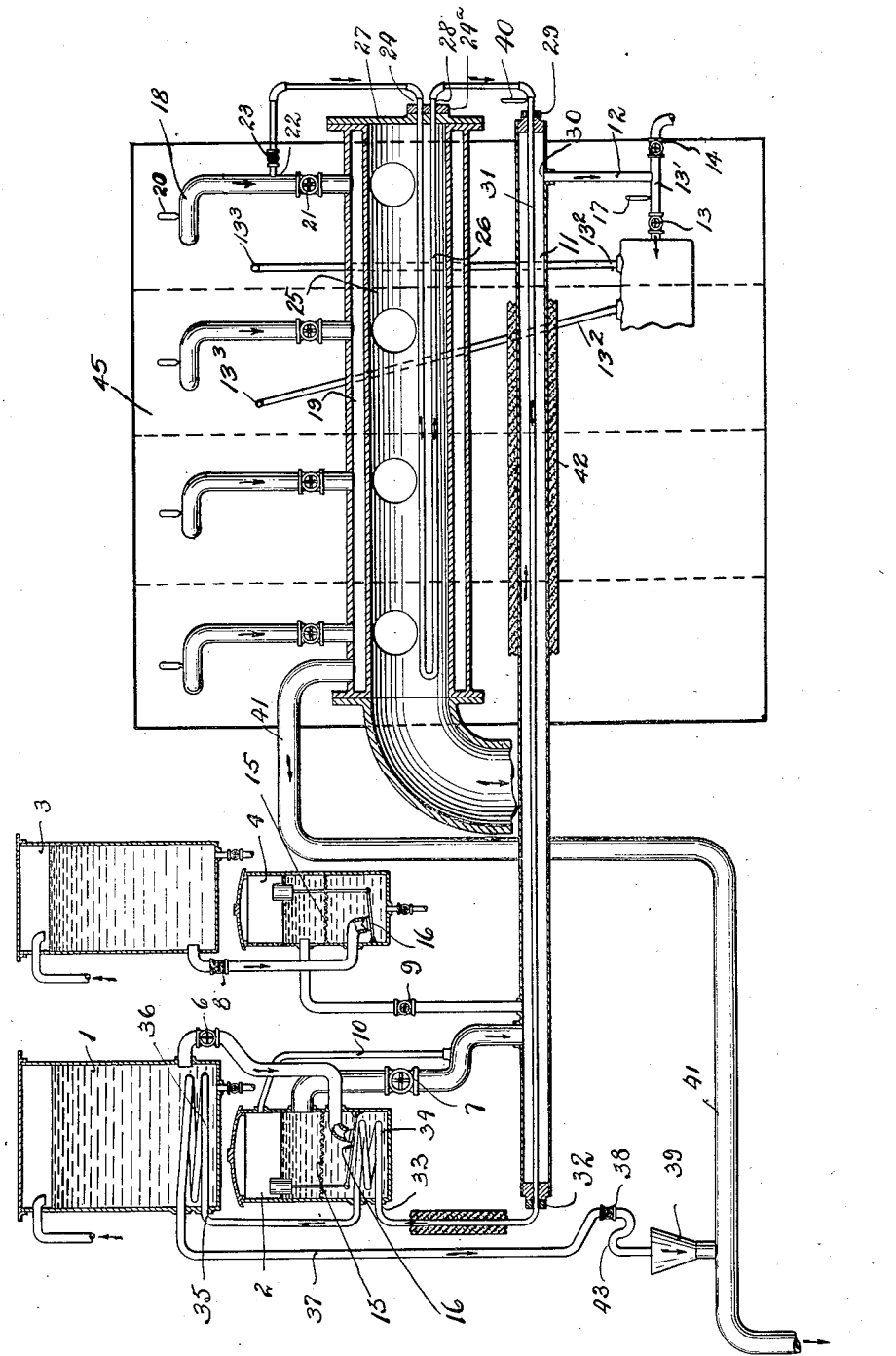

1,819,474

UNITED STATES PATENT OFFICE

GUSTAV MEYER, OF MATANZAS, CUBA

APPARATUS FOR FEEDING HEAVY CRUDE OIL IN INTERNAL COMBUSTION ENGINES OF THE INJECTION TYPE

Application filed April 24, 1928. Serial No. 272,550.

This invention relates to apparatus for feeding fuel in injection type of internal combustion engines, and has for its object to provide a preheating system therefor whereby high viscosity crude oil can be readily and conveniently used as a fuel for injection engines without any admixture and without any auxiliary heating apparatus.

Another object of this invention is to so construct the apparatus that the same can be readily applied to any existing injection type of internal combustion engine without any material changes in the general construction thereof, and so that its installation can be accomplished within a relatively short time by any skilled mechanic.

The principle underlying my invention is that small quantities of fuel are subjected to relatively large heating areas.

The use of my new preheating system has the advantage that the cost of operation of the engine owing to the low price of high viscosity crude oil will be reduced to a minimum.

With these objects in view my invention consists in that the cooling water used for the combustion engine is heated by the combustion gases and utilized for heating the crude oil not only in the supply tank but throughout its course from said tank to the fuel feed pump.

The heated water is conveyed through the fuel pipe counter to the direction of the fuel. I also arrange suitable control valves whereby the circulation of the heated water can be so controlled as to procure the necessary temperature required for the atomization of the crude oil.

My invention will be more fully understood by reference to the accompanying drawing in which similar reference characters denote corresponding parts and in which the figure is a diagrammatic sectional view of an injection type of internal combustion engine equipped with my invention and of which only so much is shown as will be necessary for a clear understanding of my invention.

In the drawing 45 denotes diagrammatically the cylinders of a four cylinder internal combustion injection engine of any known construction, either of the airless type or that in which air is used as part of the fuel.

25 denotes the exhaust pipe which, as usual, is surrounded by a cooling jacket 19 and 41 is the discharge pipe leading from the latter. 18 are cooling water pipes connecting the cooling jackets of the cylinders with the cooling jacket 19, 20 denote thermometers and 21 throttle valves on said pipes, which serve for regulating the discharge temperature. Branching off from one of the water pipes 18 is a tube 22 having a cock 23 for stopping the water flow, for heating purposes. At a point 24 through the end wall 27 of exhaust pipe 24, tube 22 leads into a coil 26 extending longitudinally through said exhaust pipe 25. Said coil 26 communicates at point 28 with a pipe 31 extending longitudinally through the fuel feed 11. A thermometer 40 is associated with pipe 31. Suitable packings 24ª, 29 and 32 are provided in the end wall of the water jacket 19 and those of the exhaust pipe for tightening the openings through which extend the pipes 26 and 31. The fuel feed pipe 11 which may be made of several short longitudinal sections must be arranged at a slight inclination, say ½ inch per yard and must lead to the fuel pump from above, in order that the air and gas bubbles formed be caused to rise by themselves and escape as will be hereinafter described. The fuel feed pipe at point 30, where the temperature is at a maximum, terminates through pipe 12 in the pipe 13' leading to the fuel pump and is provided with thermometer 17 and stop cock 13. The opposite end of the hot water pipe 31 leads at the point 33 into a coil 34 of two convolutions arranged in the filtering vessel 2 for the heavy crude oil and thence at point 35 into another coil 36 of two convolutions arranged in the crude oil tank 1 and which through pipe 37 formed at its free end with multiple bends 43 and a throttle valve 38 terminates in a flow off funnel 39 communicating with the main cool water discharge pipe 41 of the motor. By providing the multiple bend, the water is prevented from splashing and a quiet discharge is assured.

3 denotes a tank containing thin fuel oil for starting the motor and 4 denotes a filtering vessel therefor. The tanks 1 and 3 through pipes having stop cocks 6 and 8 respectively communicate with their corresponding filtering tanks, 2 and 4. Each of the filtering tanks has a strainer 15. The ends of the pipes leading from the tanks 1 and 3 into the filtering vessels are controlled by float valves 16. Leading from points above the strainer 15 of the tanks 2 and 4 to the fuel feed pipe 11 are pipes having stop cocks 7 and 9. The pipe leading from the filtering vessel 2 also has an air or gas discharge pipe 10 which leads into the filtering tank and which is always open so that the air and gas bubbles formed may easily escape.

To prevent radiation of the heat the exposed parts of the different pipes, as fuel pipe, pressure and heating pipes have packing 42 of asbestos or like insulation. The cocks 7 and 9 permit the change of fuel at starting and stopping of the motor.

The mode of operation is as follows:

Hot water circulation

Part of cooling water contained in the pipe 18 between the thermometer 20 and the stop cock 21 flows at 22 through the open cock 23 and at point 24 enters the coil 26 in which it is heated by the waste gases flowing through the waste gas pipe 25. Leaving the latter at point 28 and passing the thermometer 40 it enters at point 29 the pipe 31 running through the fuel feed pipe 11. At point 32 the hot water leaves the fuel pipe and at 33 enters the coil 34 of the filtering vessel 2 for the crude oil. From this coil it passes at point 35 into coil 36 of the crude oil tank 1, and thence through pipe 37 and the throttle cock 38, and multiple bends 43 into the flow off funnel 39.

The circulation of thin oil

The thin oil contained in the tank 3 passes through the cock 8 into the filtering vessel above the float valve 16 and on passing the strainer 15 flows through the cock 9 into the fuel pipe 11. Here it becomes strongly heated and enters at 30 where the highest temperature reigns in the pipe 12. Here it flows past the thermometer 17 through the stop cock 13 into fuel feed pump.

Circulation of crude oil

From the tank 1 the crude oil heated by coil 36 passes through the cock 6 into the filtering vessel 2 above the float valve 16 and is there further heated by coil 34. Thence passing the strainer 15 it flows through the open cock 7 into the fuel pipe 11, through which flows boiling water and steam, when sufficiently heated, and in which it becomes still more heated (heating may proceed to 100° C. (212° F.)) and at the maximum point 30 of temperature enters the pipe 12, passes the thermometer 17 through cock 13, into the fuel feed pump which injects the hot fuel in atomized state into the cylinder, as for instance through pipe $13^2$ to inlet $13^3$ in said cylinder. Cock 14 serves for the discharge from the pipe 11.

To start the engine I use a mixture of 50% crude oil and 50% fuel oil. The feed of fuel oil can be discontinued before the load is applied as the heavy crude oil becomes sufficiently heated by the fuel oil when reaching the fuel pump.

I have found that 100% heavy crude oil can be used for any load. All that is necessary is to properly adjust the throttle valve 38 so that the necessary quantity of water will be heated by the exhaust gases and the desired temperature automatically attained.

In case the load is changeable the adjustment can be such that the temperature will remain normal. I have used in my experiment 2 atmospheres water pressure when starting the engine and have increased the same to 3 atmospheres according to the load. The temperature of the hot water was always 43° C. I found that the fuel is uniformly heated without any adjustment of the heating system which takes place under full water pressure and therefore cannot fail.

My system can be used with engines with or without compressors. In localities where the water is hard it is advisable to cleanse the pipes from time to time by suitable acids. The fuel levels in the filtering tanks are held by the float valves always below the fuel inlets $13^3$ in the cylinders so that no fuel can enter the cylinders when the engine is not in operation. The air pipe 10 terminates above the fuel level in the filtering tank and is always open.

What I claim is:

1. Apparatus for directly injecting high viscosity crude oils into an internal combustion engine of the injection type comprising, a crude oil supply tank, a filter tank communicating with said first named tank, a float valve control for said second tank for regulating the level of the liquid therein, a fuel feed pump for injecting the fuel into the cylinders of said engine, a fuel feed line joining said filter tank with said pump, said float valve maintaining the level of the fuel in said filter tank below the level of the fuel inlet to said cylinder, a thin starting oil supply tank connected to said same fuel line, means for independently controlling the flow from said crude oil tank and said thin oil tank to said fuel line, a water cooling system for said engine, an auxiliary pipe system for hot water branching off from said main cooling system, said auxiliary system passing through the exhaust of said engine, a portion of said fuel supply line, the said first named two tanks and out to the atmosphere, and regulating means in said auxiliary pipe system for controlling the flow of water therethrough.

2. Apparatus for directly injecting high viscosity crude oils into an internal combustion engine of the injection type comprising, a crude oil supply tank, a filter tank communicating with said first named tank, means for controlling the level of the crude oil in said filter tank and maintaining said level below the inlet level to the cylinders of said engine, a fuel feed pump for injecting said fuel into said cylinders, a fuel feed line joining said filter tank with said pump, a thin starting oil tank connected to said same fuel line, means for independently controlling flow from said crude oil and thin oil tanks to said fuel feed line, an auxiliary pipe system for hot water branching off from the main water cooling system of said engine, said auxiliary pipe system leading to a coil in the exhaust of said engine whereby the water flowing therethrough is heated, then leading through a portion of said fuel feed line, the direction of flow of the water being such that it enters the said pipe system passing through said fuel line through the end nearest the inlet to said fuel feed pump, said pipe system then leading through said first named two tanks and out to the atmosphere and means for regulating the flow of water in said auxiliary pipe system.

3. Apparatus for directly injecting high viscosity crude oils into an internal combustion engine of the injection type comprising a crude oil supply tank, a filter tank communicating with said first named tank, means for controlling the level of the crude oil in said filter tank and maintaining the level below the inlet level to the cylinders of said engine, a fuel feed pump for injecting the fuel into said cylinders, a fuel feed pipe joining said filter tank and said fuel feed pump, a thin starting oil supply tank connected to said same fuel line, means for independently controlling the flow from said crude oil and thin oil tanks to said fuel feed line, an air and gas discharge pipe leading from said fuel feed pipe to said filter tank and terminating above the level of said oil therein, an auxiliary pipe system for hot water branching off from the main water cooling system of said engine and passing through the exhaust, a portion of said fuel feed pipe, the said filter tank and crude oil tank and out to the atmosphere and means for regulating the flow of water in said auxiliary pipe system.

4. Apparatus for directly injecting high viscosity crude oils into an internal combustion engine of the injection type comprising, a crude oil supply tank, a filter tank communicating with said first named tank, means for controlling the level of the crude oil in said filter tank and maintaining said level below the fuel inlet level to the cylinders of said engine, a fuel feed pump for injecting the fuel into said cylinders, a fuel feed pipe joining said filter tank and said fuel feed pump and provided with an enlarged section which slopes downwards toward said fuel feed pump, a thin fuel oil supply tank connected to said same fuel feed pipe, means for independently controlling the flow from said crude oil and thin oil tanks to said fuel feed pipe, an auxiliary pipe system for hot water branching off from the main water cooling system of said engine, a section of said pipe system passing through the exhaust of said engine, a second section thereof passing through said enlarged portion of said fuel feed pipe, and other sections of said pipe system passing through the said first named two tanks and then out to the atmosphere, said pipe system being so arranged that the direction of flow of the water in said section passing through said enlarged portion of said fuel feed pipe, is counter to the flow of oil in said last named pipe, and means for regulating the flow of water in said auxiliary pipe system.

5. Apparatus for directly injecting high viscosity crude oils into an internal combustion engine of the injection type comprising, a crude oil supply tank, a fuel feed pump for injecting fuel into the cylinders of said engine, a fuel feed line joining said pump and tank, a thin starting oil supply tank connected to said same fuel line, means for independently controlling the flow from each of said two tanks to said line, a water cooling system for said engine, an auxiliary pipe system for hot water branching off from said main cooling system, said auxiliary system passing through the exhaust of said engine, a portion of said fuel supply line, the said crude oil tank and out to the atmosphere and regulating means in said auxiliary pipe system for controlling the water flow therethrough.

6. Apparatus for directly injecting high viscosity crude oils into an internal combustion engine, of the injection type, comprising, crude oil supply means, means for injecting said crude oil into the cylinders of said engine, a fuel feed line joining said two means, thin starting oil supply means connected to said same fuel line, a water cooling system for said engine, an auxiliary pipe system for hot water branching off from said main cooling system, said auxiliary system passing through the exhaust of said engine, a portion of said fuel supply line, the said crude oil supply means and out to the atmosphere.

7. Apparatus for directly injecting high viscosity crude oils into an internal combustion engine of the injection type comprising, a crude oil supply tank, a filter tank communicating with said first named tank, a thin starting oil supply tank, a fuel feed pump for injecting fuel into the cylinders of said engine, a fuel feed pipe joining said filter tank and said fuel feed pump and provided with an enlarged section, said latter being straight in its entirety and sloping downwards towards said fuel feed pump, means joining said thin oil supply tank near the high end of said enlarged portion of said fuel feed line, a water cooling system for said engine and an auxiliary pipe system for hot water branching off from said cooling system, said auxiliary system passing through the exhaust pipe of said engine, the enlarged portion of said fuel supply line, the said crude oil tank and out to the atmosphere, and means in said auxiliary system for controlling the water flow therethrough.

In testimony whereof I affix my signature.

GUSTAV MEYER.